(12) United States Patent
Mochizuki

(10) Patent No.: US 11,840,170 B2
(45) Date of Patent: Dec. 12, 2023

(54) VEHICLE LAMP HAVING TWO LAMP UNITS EACH HAVING A TWO LIGHT SOURCES AND A RECEIVER FOR DETECTING AN INTENSITY OF REFLECTED LIGHT

(71) Applicant: KOITO MANUFACTURING CO., LTD., Tokyo (JP)

(72) Inventor: Mitsuyuki Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/800,864

(22) PCT Filed: Feb. 15, 2021

(86) PCT No.: PCT/JP2021/005530
§ 371 (c)(1),
(2) Date: Aug. 18, 2022

(87) PCT Pub. No.: WO2021/166849
PCT Pub. Date: Aug. 26, 2021

(65) Prior Publication Data
US 2023/0081252 A1    Mar. 16, 2023

(30) Foreign Application Priority Data

Feb. 18, 2020   (JP) ................................ 2020-025321

(51) Int. Cl.
*B60Q 1/14*       (2006.01)
*F21S 41/675*   (2018.01)
(Continued)

(52) U.S. Cl.
CPC ............... *B60Q 1/14* (2013.01); *F21S 41/13* (2018.01); *F21S 41/675* (2018.01); *F21W 2102/13* (2018.01)

(58) Field of Classification Search
CPC ............ F21S 41/13; F21S 41/675; B60Q 1/14
See application file for complete search history.

(56) References Cited

U.S. PATENT DOCUMENTS

| 11,009,696 B2 * | 5/2021 | Mukojima ............ F21S 41/151 |
| 2014/0042325 A1 | 2/2014 | Yamamura |
| 2019/0179138 A1 | 6/2019 | Koller et al. |

FOREIGN PATENT DOCUMENTS

| DE | 10354714 A1 | 6/2005 |
| DE | 102017222078 A1 | 6/2019 |

(Continued)

OTHER PUBLICATIONS

International Search Report issued in corresponding International Application No. PCT/JP2021/005530; dated Apr. 20, 2021 (5 pages).

(Continued)

*Primary Examiner* — Robert J May
(74) *Attorney, Agent, or Firm* — Osha Bergman Watanabe & Burton LLP

(57) ABSTRACT

The vehicle lamp includes a first lamp unit and a second lamp unit each including a first light source configured to emit an emission beam (visible light), a second light source configured to emit infrared light for sensing having a peak wavelength different from that of the first light source, and a light receiving unit configured to detect an intensity of reflected light of the infrared light emitted from the second light source. The light distribution control is performed on the light emitted from the first light source in accordance with the intensity of the reflected light detected by the light receiving unit, and the peak wavelength of the light emitted from the second light source of the first lamp unit and the peak wavelength of the light emitted from the second light source of the second lamp unit are different from each other.

6 Claims, 9 Drawing Sheets

(51) Int. Cl.
*F21S 41/13* (2018.01)
*F21W 102/13* (2018.01)

(56) References Cited

FOREIGN PATENT DOCUMENTS

| EP | 2700538 A1 | 2/2014 |
|---|---|---|
| JP | 2008224614 A | 9/2008 |
| JP | 2012224317 A | 11/2012 |
| JP | 2016-018668 A | 2/2016 |
| JP | 2019158543 A | 9/2019 |

OTHER PUBLICATIONS

Written Opinion of the International Searching Authority issued in corresponding International Application No. PCT/JP2021/005530; dated Apr. 20, 2021 (4 pages).
Extended European Search Report issued in European Application No. 21757580.2 dated Jul. 12, 2023 (10 pages).

\* cited by examiner

VEHICLE LAMP HAVING TWO LAMP UNITS EACH HAVING A TWO LIGHT SOURCES AND A RECEIVER FOR DETECTING AN INTENSITY OF REFLECTED LIGHT

TECHNICAL FIELD

The present disclosure relates to a vehicle lamp.

BACKGROUND ART

Patent Literature 1 discloses an obstacle detection device configured to improve detection accuracy of an obstacle while controlling light distribution by visible light. The obstacle detection device is used as a vehicle headlamp or the like, and includes a light source including an LED unit that emits the visible light and an infrared light unit that emits infrared light, a rotating reflector that rotates in one direction around a rotation axis while reflecting the visible light and the infrared light emitted from the light source, and an imaging unit having sensitivity in a spectrum region of the infrared light. The rotating reflector emits, by a rotating operation, the visible light from the LED unit as an emission beam, scans the emission beam to form a first light distribution pattern, emits the infrared light from the infrared light unit as an emission beam, scans the emission beam to form a second light distribution pattern, determines whether the obstacle that hinders vehicle traveling is present in a partial region based on an image acquired by the imaging unit, and controls lighting of a light emitting element such that the obstacle is irradiated with the emission beam of the visible light when the obstacle is present in the partial region.

CITATION LIST

Patent Literature

Patent Literature 1: JP-A-2012-224317

SUMMARY OF INVENTION

Technical Problem

The obstacle detection device disclosed in Patent Literature 1 emits the infrared light together with the visible light, and determines whether there is the obstacle that hinders the vehicle traveling in the partial region based on the image acquired by the imaging unit having sensitivity in the spectrum region of the infrared light.

Here, when a configuration of the obstacle detection device disclosed in Patent Literature 1 is individually applied to, for example, a left headlamp provided on a left headlamp provided on a front end portion left side of the vehicle and a right headlamp provided on a front end portion right side of the vehicle, and light distribution control of an emission beam emitted from each of the headlamps is individually performed, there is a possibility that stability and accuracy of the light distribution control are affected by the infrared light emitted from one headlamp being incident on the imaging unit of the other headlamp.

An object of the present disclosure is to provide a vehicle lamp capable of stably and accurately performing light distribution control of an emission beam.

Solution to Problem

According to an aspect of the present disclosure, a vehicle lamp includes: a first lamp unit and a second lamp unit each including a first light source configured to emit light, a second light source configured to emit light having a peak wavelength different from that of the first light source, and a light receiving unit configured to detect an intensity of reflected light of the light emitted from the second light source; and a control unit configured to perform light distribution control of the light emitted from the first light source in accordance with the intensity of the reflected light detected by the light receiving unit, in which a peak wavelength of the light emitted from the second light source of the first lamp unit is different from a peak wavelength of the light emitted from the second light source of the second lamp unit.

According to an aspect of the present disclosure, a vehicle lamp includes: a first lamp unit and a second lamp unit each including a first light source configured to emit light, a second light source configured to emit light having a peak wavelength different from that of the first light source, and a light receiving unit configured to detect an intensity of reflected light of the light emitted from the second light source; and a control unit configured to perform light distribution control of the light emitted from the first light source in accordance with the intensity of the reflected light detected by the light receiving unit, and to perform control such that the second light source of the first lamp unit and the second light source of the second lamp unit do not emit the light at the same time.

Other technical problems and methods for solving the technical problems disclosed in the present application will become apparent from the description of embodiments of the present invention and the drawings.

Advantageous Effects of Invention

According to the present disclosure, it is possible to stably and accurately perform light distribution control of an emission beam.

DESCRIPTION OF EMBODIMENTS

Figure 1:
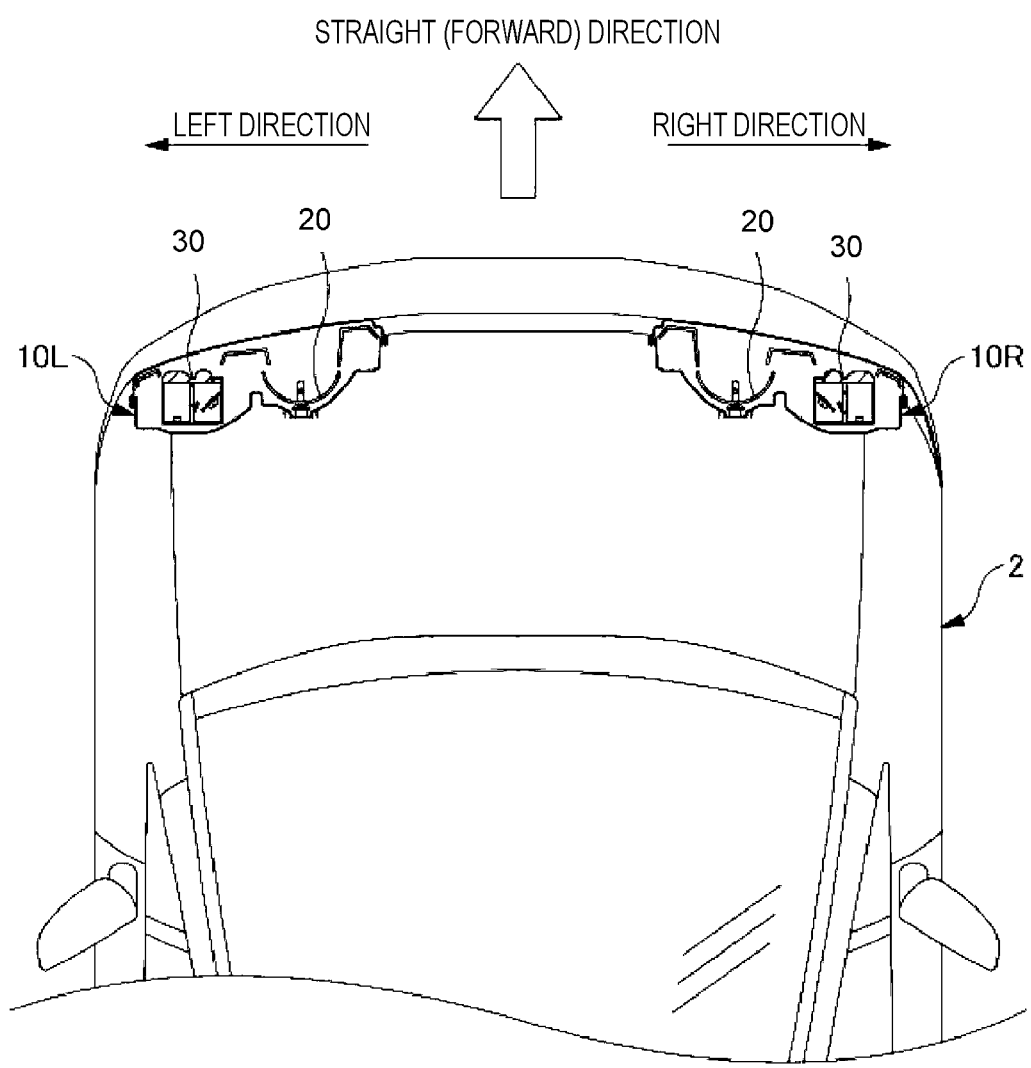
FIG. 1 is an example of a vehicle (automobile) on which a vehicle lamp is mounted, and is a view of a front end portion of the vehicle as viewed from above.

Hereinafter, an embodiment of the present disclosure will be described with reference to the drawings. In the following description, the same or similar components may be denoted by the same reference numerals, and redundant description thereof may be omitted.

FIG. 1 is an example of a vehicle 2 (automobile) on which a vehicle lamp 1 according to the embodiment is mounted, and is a view of a front end portion of the vehicle 2 as viewed from above. As shown in FIG. 1, the vehicle 2 includes, as the vehicle lamp 1, a right headlamp 10R mounted on a right side of the front end portion of the vehicle 2 and a left headlamp 10L mounted on a left side of the front end portion. Since the right headlamp 10R and the left headlamp 10L have the same structure except that they have a bilaterally symmetrical structure, the right headlamp 10R will be mainly described below.

Figure 2:
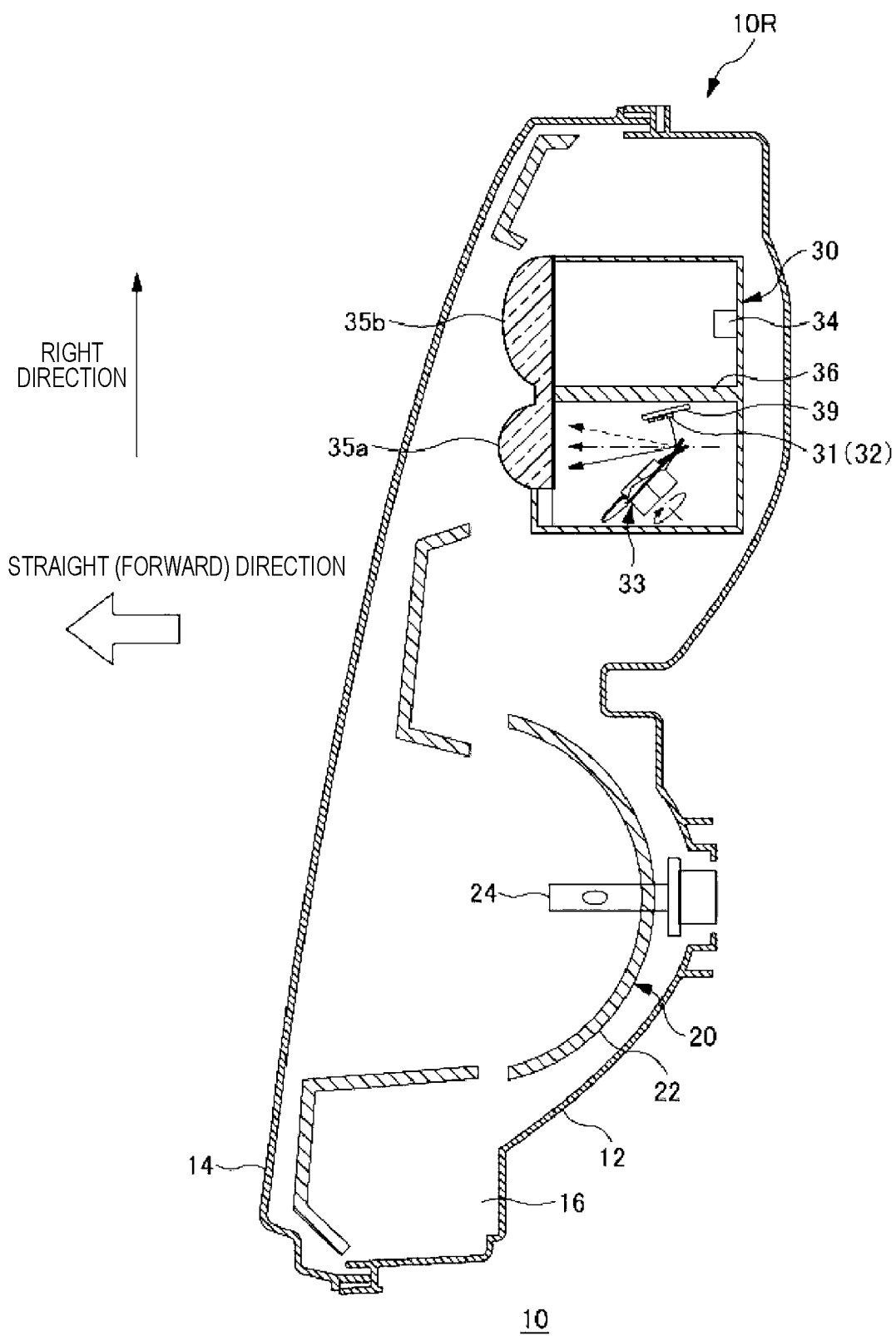
FIG. 2 is a horizontal sectional view of a right headlamp.

FIG. 2 is a horizontal sectional view of the right headlamp 10R shown in FIG. 1. The right headlamp 10R includes a rear body 12 having a recessed portion that opens forward (in a straight (forward) direction of the vehicle 2). The rear body 12 forms a lamp chamber 16 by being combined with a transparent front cover 14 that covers the front opening of the rear body 12. A lamp unit (hereinafter, referred to as a "LB unit 20") that emits visible light having a predetermined wavelength (for example, visible light including a wavelength of 400 nm to 700 nm) as a low beam is disposed on a left portion of the lamp chamber 16. Further, a lamp unit (hereinafter, referred to as a "HB unit 30") that emits the visible light having the predetermined wavelength (for example, the visible light including the wavelength of 400 nm to 700 nm) as a high beam is disposed on a right portion of the lamp chamber 16.

The LB unit 20 includes a reflector 22 and a light source 24 supported by the reflector 22. The light source 24 is configured using, for example, a light emitting diode (LED) or an incandescent bulb. The reflector 22 is supported in the lamp chamber 16 using, for example, an aiming screw or a nut. The HB unit 30 implements an adaptive driving beam (ADB) that forms an optimal light distribution pattern in consideration of presence of a preceding vehicle or an oncoming vehicle.

Figure 3:
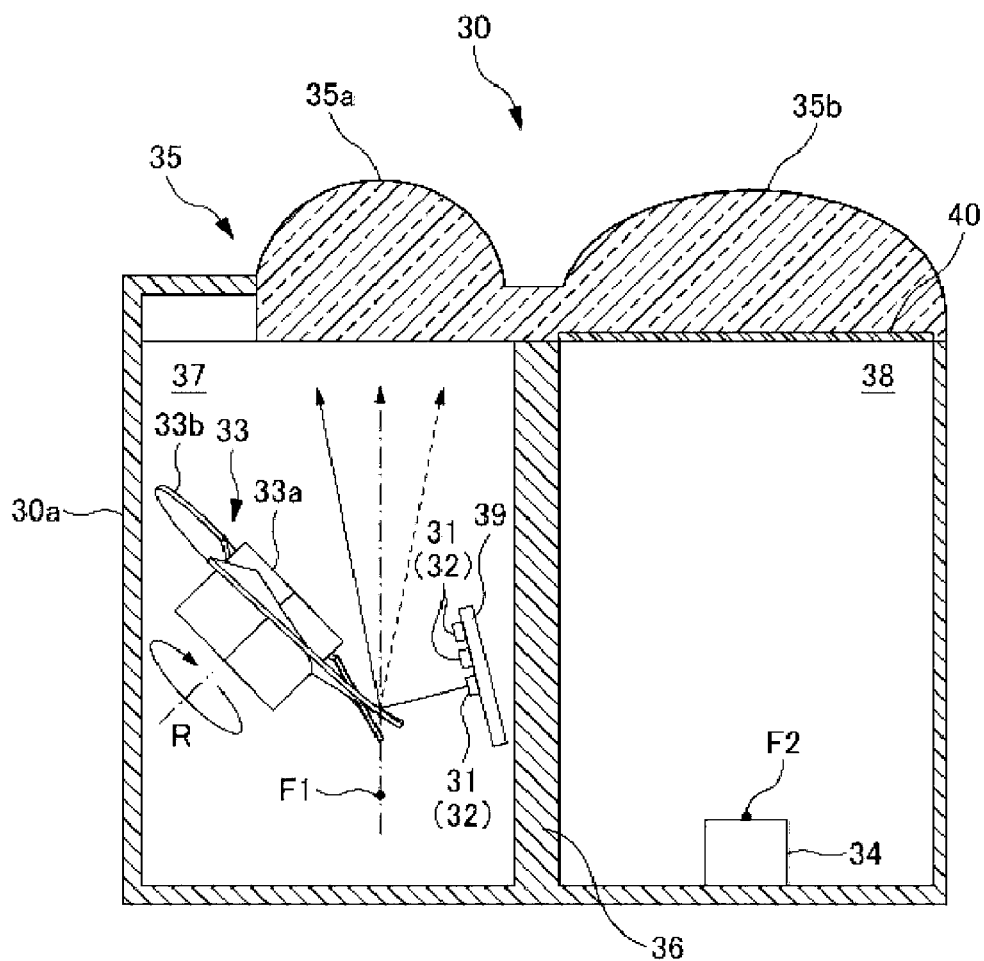
FIG. 3 is a diagram showing a configuration of a high beam (HB) unit.

FIG. 3 shows an internal structure of the HB unit 30. Main parts of the HB unit 30 are accommodated in a housing 30a. As shown in FIG. 3, the housing 30a includes a first lamp chamber 37 and a second lamp chamber 38 partitioned by a light shielding wall 36. The first lamp chamber 37 is provided with first light sources 31, second light sources 32, and a rotating reflector 33 which constitute an emission system. The second lamp chamber 38 is provided with a light receiving unit 34 constituting a light receiving system. A lens component 35 and an optical filter 40 are provided in front of the housing 30a.

The first light sources 31 emit the visible light (emission beam) that is emitted to a front of the vehicle 2 in order for a driver of the vehicle 2 to visually recognize surroundings. The first light sources 31 are configured using, for example, a light emitting element such as an LED or a laser diode (LD). The second light sources 32 emit the infrared light (infrared rays) to be used for object detection or the like to the front of the vehicle 2. The second light sources 32 are configured using, for example, a light emitting element such as a LD. The first light sources 31 and the second light sources 32 are provided on one surface (a surface on a side on which the rotating reflector 33 is present) of a common substrate (hereinafter, referred to as a "common substrate 39").

Figure 4A:
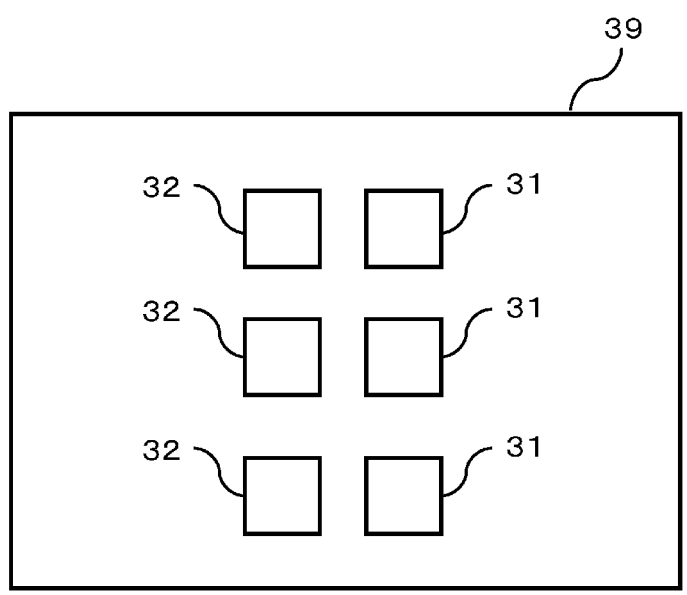
FIG. 4A is an example of a common substrate, and is a plan view of the common substrate as viewed from a surface on a side on which rotating reflectors are present.

FIG. 4A is a plan view of the common substrate 39 as viewed from the surface on the side on which the rotating reflector 33 is present. As shown in FIG. 4A, three first light sources 31 are linearly arranged side by side on the surface of the common substrate 39. Further, on the common substrate 39, three second light sources 32 are linearly arranged adjacent to the three first light sources 31.

Figure 4B:
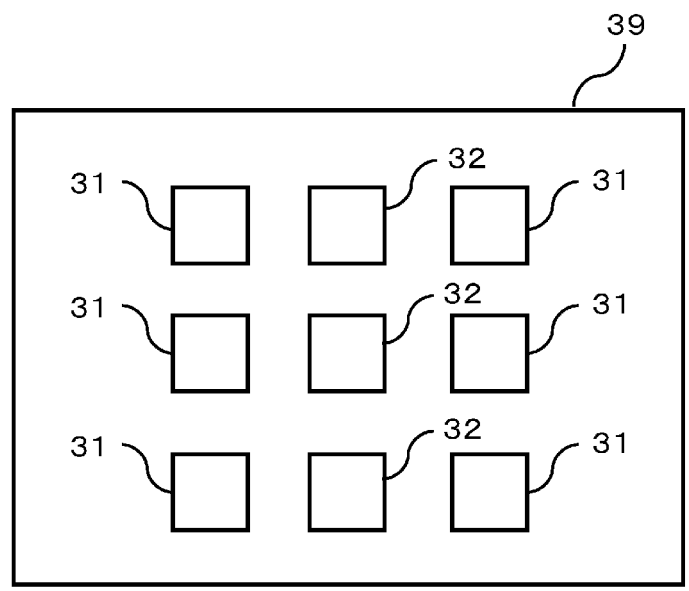
FIG. 4B is an example of a common substrate, and is a plan view of the common substrate as viewed from a surface on a side on which rotating reflectors are present.

The number and arrangement method of the first light sources 31 and the second light sources 32 are not necessarily limited. For example, as shown in FIG. 4B, three first light sources 31 linearly arranged side by side may be provided adjacent to both sides of three second light sources 32 linearly arranged side by side on the common substrate 39. In this case, an emission region of the visible light (emission beam) emitted from the first light sources 31 can be widened, and the emission region can be illuminated more brightly.

Figure 5:
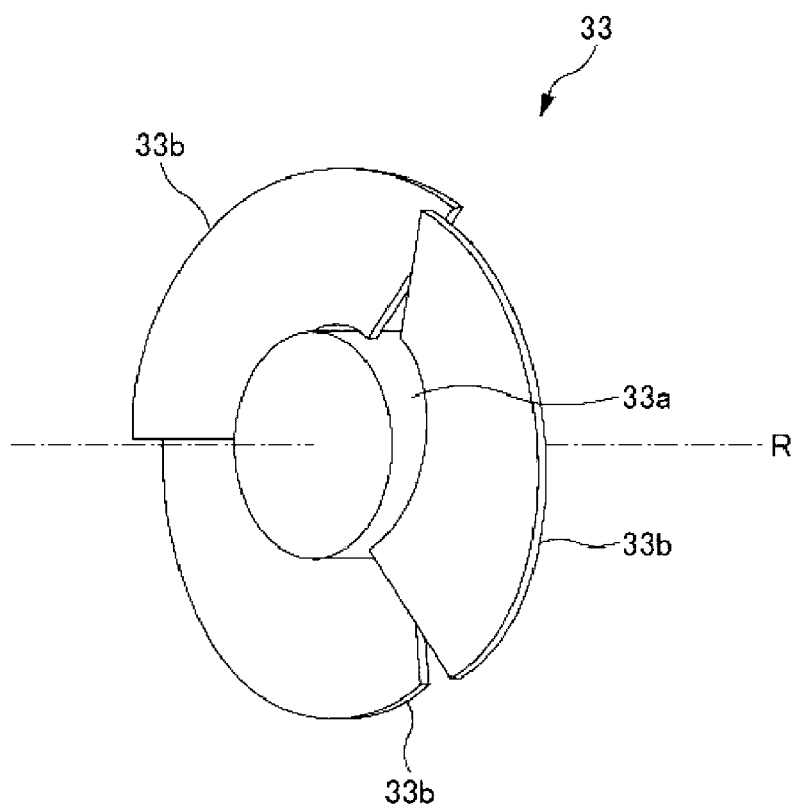
FIG. 5 is a perspective view showing a structure of the rotating reflector.

FIG. 5 is a perspective view of the rotating reflector 33 shown in FIG. 3. The rotating reflector 33 is rotated about an axis R as a rotation axis by a driving source such as a motor. The rotating reflector 33 includes a substantially columnar shaft portion 33a having the axis R as a central axis, and three blades 33b extending in a radial direction from the shaft portion 33a. Each of the three blades 33b has a twisted shape in which an angle with respect to the axis R gradually changes in a circumferential direction. Surfaces of the three blades 33b on a side on which the common substrate 39 is provided is reflective surfaces that reflect the visible light emitted from the first light sources 31 and the infrared light emitted from the second light sources 32, and are provided with portions that reflect the light emitted from the first light sources 31 forward and portions that reflect the light from the second light sources 32 forward.

The rotating reflector 33 reflects the light emitted from the first light sources 31 and the second light sources 32 while rotating, and forms a desired light distribution pattern in front of the vehicle 2. When the rotating reflector 33 rotates, a reflection direction of the light changes from one end portion to the other end portion of the left and right end portions in a region in front of the vehicle 2 where the light distribution pattern is to be formed. The rotating reflector 33 shown as an example is configured to be able to scan the front of the vehicle 2 once in one direction (horizontal direction) by the light emitted from each of the first light sources 31 and the second light sources 32 by rotating by 120 degrees.

An arrangement form of the first light sources 31 and the second light sources 32, the number and shape of the blades 33b, and a rotation speed of the rotating reflector 33 are set based on, for example, results of experiments and simulations and the like in consideration of forms and characteristics of the required light distribution pattern, prevention of image flickering, and the like. As the motor, a motor capable of acquiring information on a rotation timing from the motor itself is suitable. As the motor, for example, a DC brushless motor is used.

Returning to FIG. 3, the light receiving unit 34 is configured by using a light receiving element (infrared sensor) capable of detecting an intensity of the reflected light obtained by the infrared light emitted from the second light sources 32 being reflected by the object such as the forward vehicle or the oncoming vehicle and returned. When the light receiving unit 34 receives the reflected light, the light receiving unit 34 outputs a signal indicating the intensity of the received reflected light. The light receiving element is configured using, for example, a semiconductor element such as a photodiode.

The lens component 35 includes a first lens element 35a disposed in front of the first lamp chamber 37 and a second lens element 35b disposed in front of the second lamp chamber 38. The first lens element 35a and the second lens element 35b are integrally formed as single lens components. A position of a rear focal point F1 of the first lens element 35a is closer to a front side of the vehicle 2 than a position of a rear focal point F2 of the second lens element 35b. The rotating reflector 33 is provided in the first lamp chamber 37 such that a reflection point thereof is positioned in the vicinity of the focal point of the first lens element 35a. The light emitted from the first light sources 31 and the second light sources 32 and reflected by the rotating reflector 33 passes through the first lens element 35a and is emitted toward the front of the vehicle 2. The second lens element 35b focuses the reflected light returning from the front of the vehicle 2 on the light receiving unit 34 when the infrared light emitted from the second light sources 32 is emitted to the object such as the forward vehicle or the oncoming vehicle. The light receiving unit 34 is provided in the second lamp chamber 38 such that a light receiving surface thereof is positioned in the vicinity of the focal point of the second lens element 35b.

The light shielding wall 36 is provided between an optical axis of the first lens element 35a and an optical axis of the second lens element 35b. The light shielding wall 36 is provided so as to shield the light emitted from the first light sources 31 and the second light sources 32 from being directly incident on the light receiving unit 34.

The optical filter 40 is attached to a back surface (a surface facing the light receiving unit 34) of the second lens element 35b. The optical filter 40 performs, for example, dimming of the visible light (or reflected light thereof) emitted from the first light sources 31, and wavelength selection of the infrared rays incident on the light receiving unit 34.

Figure 6:
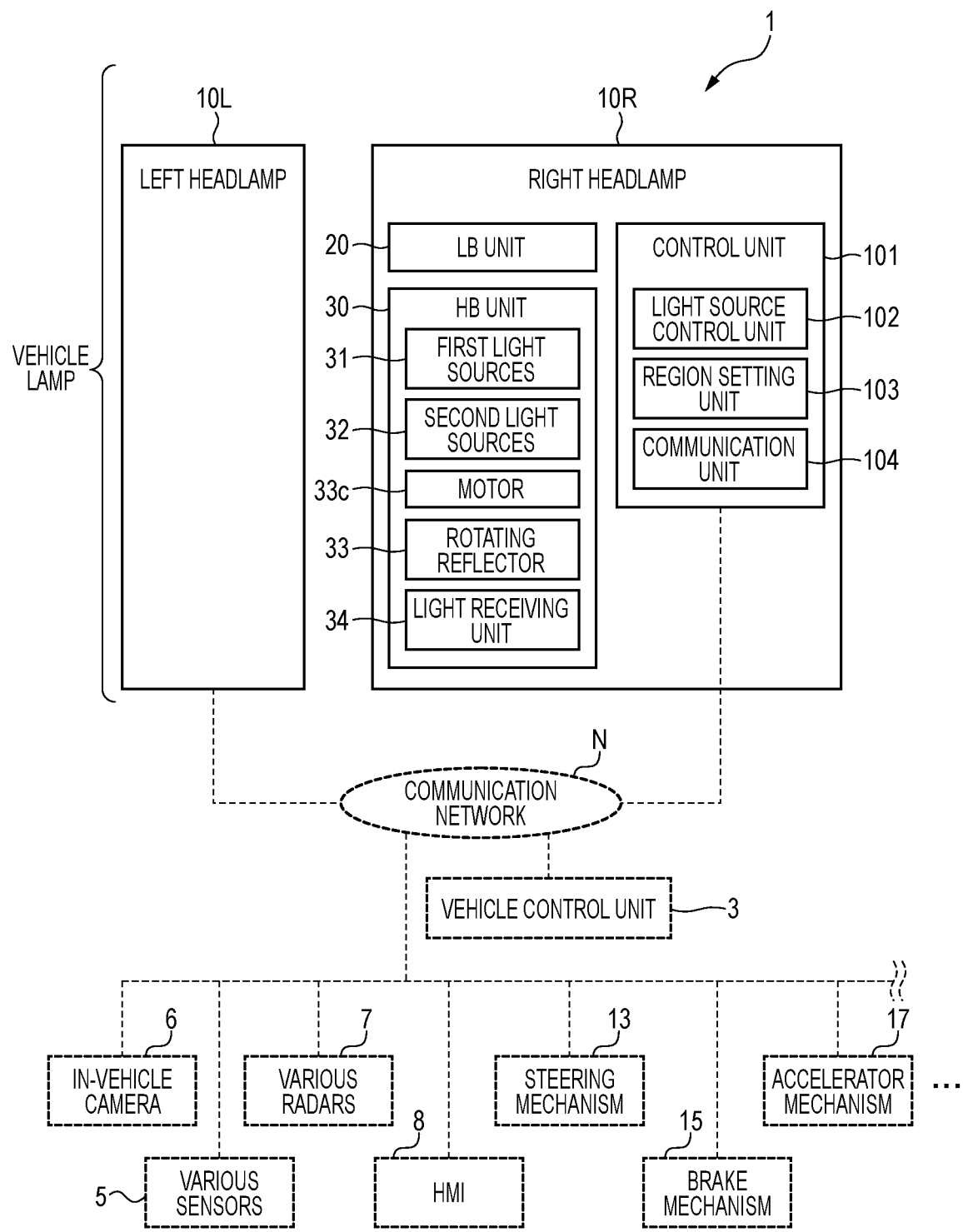
FIG. 6 is a system block diagram of the vehicle lamp.

FIG. 6 is a system block diagram of the vehicle lamp 1. Since the left headlamp 10L has the same configuration as the right headlamp 10R, FIG. 6 shows the left headlamp 10L in a simplified manner. As shown in FIG. 6, the right headlamp 10R includes a control unit 101 in addition to the LB unit 20 and the HB unit 30. The control unit 101 includes a light source control unit 102 that controls lighting states of the first light sources 31 and the second light sources 32, a region setting unit 103 that sets a dimming region irradiated with the visible light emitted from the first light sources 31 at an luminance lower than other regions (including a case in which the visible light is not emitted), and a communication unit 104 that communicates with a vehicle control unit 3 and the left headlamp 10L via a communication network N. The control unit 101 may be configured by, for example, an electronic control unit (ECU). The communication network N is a wired or wireless communication infrastructure, and is, for example, an in-vehicle local area network (LAN) configured in conformity with a communication protocol such as a control unit area network (CAN). The control unit 101 controls the LB unit 20, the first light sources 31, the second light sources 32, a motor 33c of the rotating reflector 33, and the light receiving unit 34. The control unit 101 may be provided in only one of the left headlamp 10L and the right headlamp 10R to control both the left headlamp 10L and the right headlamp 10R.

The vehicle control unit 3 is configured using, for example, an electronic control unit (ECU). The vehicle control unit 3 communicates with various devices mounted on the vehicle 2, for example, an in-vehicle camera 6, various sensors 5 (an acceleration sensor, a speed sensor, a gyro sensor, a global positioning system (GPS)), various radars 7 (a millimeter wave radar, a microwave radar, a laser radar, a light detection and ranging or a laser imaging detection and ranging (LiDAR)), a human machine interface (HMI) 8, an accelerator mechanism 17, a brake mechanism 15, a steering mechanism 13, and the like, and transmits information acquired from these devices to the control unit 101 via the communication network N. The in-vehicle camera 6 and the various radars 7 input, for example, information on surrounding environment (other vehicles, pedestrians, road shapes, traffic signs, obstacles, and the like) of the vehicle 2 to the vehicle control unit 3. The light source control unit 102 controls the LB unit 20, the first light sources 31, the second light sources 32, and the motor 33c of the rotating reflector 33 based on a received control signal.

Figure 7:
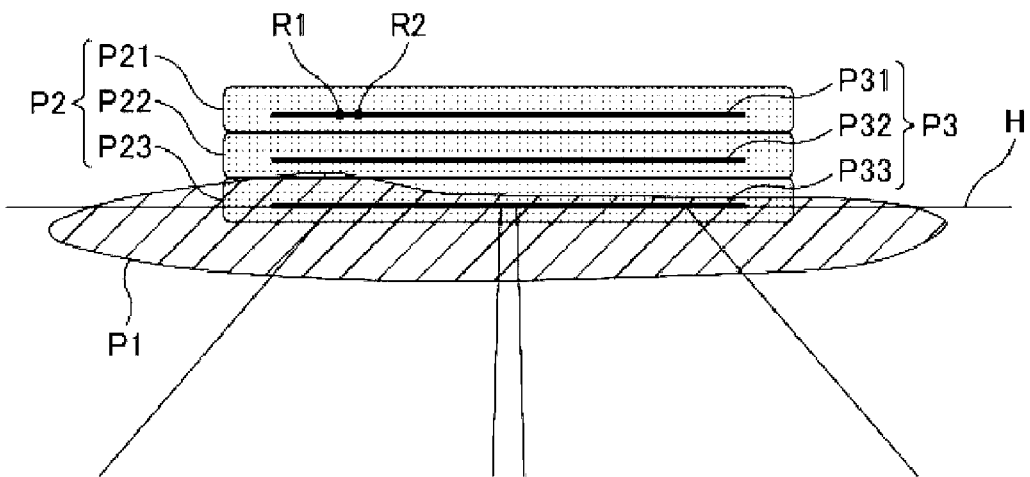
FIG. 7 is a diagram showing emission ranges of a visible light and an infrared light emitted from the vehicle lamp.

FIG. 7 is a diagram showing emission ranges of the visible light and the infrared light emitted from the vehicle lamp 1 according to the present embodiment. In FIG. 7, the emission ranges of the light emitted from the vehicle lamp 1 are shown as a case in which the emission ranges are projected on a virtual screen that is vertically and virtually installed in front of the vehicle lamp 1 mounted on the vehicle 2 traveling on a road by a predetermined distance (for example, 25 m).

In FIG. 7, a range P1 is a light distribution pattern of the low beam emitted by the LB unit 20. A range P2 is a strip-shaped region extending in a left-right direction, and is the emission range of the visible light emitted from first light sources 31 of the HB unit 30. The range P2 is, for example, a region similar to a general high beam light distribution pattern. A range P3 is the emission range of the infrared light emitted from the second light sources 32 of the HB unit 30.

The range P2 includes a range P21, a range P22, and a range P23. The range P21 is the emission range of the visible light emitted from the first light source 31 provided at an uppermost position among the three first light sources 31 provided on the common substrate 39. The range P23 is the emission range of the visible light emitted from the first light source 31 provided at a lowest position. The range P22 is the emission range of the visible light emitted from the first light source 31 provided in a middle. The range P23 is set to be a region including a horizontal line (hereinafter, referred to as "H line").

The range P3 includes a range P31, a range P32, and a range P33. These regions are linear regions extending in the left-right direction. The range P31 is the emission range of the infrared light emitted from the second light source 32 provided at an uppermost position among the three second light sources 32 provided on the common substrate 39, the range P33 is the emission range of the infrared light emitted from the second light source 32 provided at a lowest position, and the range P32 is the emission range of the infrared light emitted from the second light source 32 provided in a middle. The range P31 is set to be located in the range P21. The range P32 is set to be located in the range P22. The range P33 is set to be located in the range P23. The linear region of the range P3 is set to have, for example, a vertical width of 0.4 degrees or more in a vertical direction. In this example, the linear region of the range P33 is set so as to overlap the horizontal line viewed from a height at which the vehicle lamp 1 is mounted.

Figure 8:
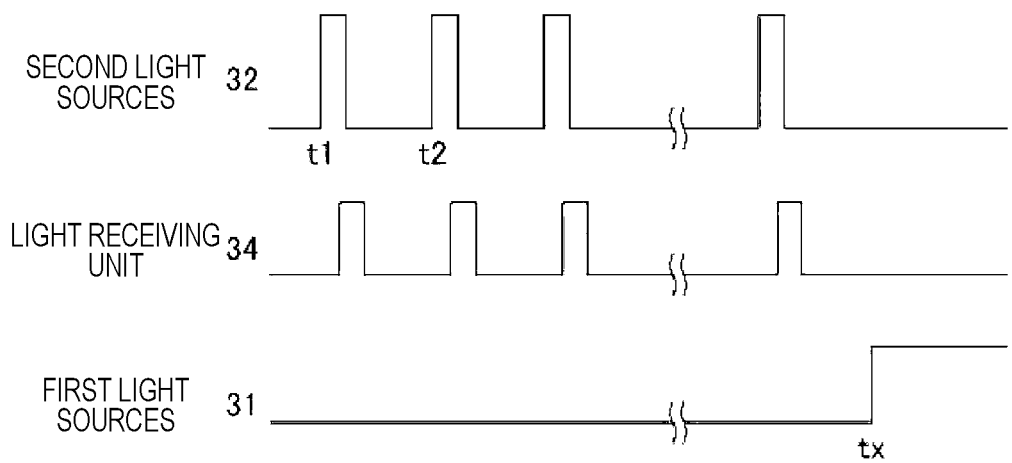
FIG. 8 is a timing chart showing light distribution control.

FIG. 8 is a timing chart showing an example of the light distribution control performed by the control unit 101. FIG.

8 shows a timing of turning on and off the first light sources 31, a timing of turning on and off the second light sources 32, and a timing of exposure of the light receiving unit 34. As shown in FIG. 8, the control unit 101 turns on and off the second light sources 32 at a high speed while rotating the rotating reflector 33 such that the infrared light is sequentially emitted to the range P3. The control unit 101 causes the light receiving unit 34 to be exposed in synchronization with turning on and off of the second light sources 32. In this example, in order to prevent the visible light emitted from the first light sources 31 from being incident on the light receiving unit 34 and affecting the light distribution control, the control unit 101 turns off the first light sources 31 during a period (during a sensing operation) in which the second light sources 32 may be turned on.

At a time point t1 in FIG. 8, a point R1 in FIG. 7 is irradiated with the infrared light. At this time, the other regions are not irradiated with the infrared light, and the first light sources 31 does not emit the visible light. In this state, the light receiving unit 34 is exposed, and the reflected light of the infrared light reflected at the point R1 is detected. Then, for example, when the intensity of the reflected light of the infrared light detected by the light receiving unit 34 is equal to or greater than a predetermined value, the control unit 101 determines that there is an object at the point R1, and when the intensity of the reflected light of the infrared light detected by the light receiving unit 34 is less than the predetermined value, the control unit 101 determines that there is no object at the point R1.

At a time point t2, the rotating reflector 33 is rotated by a predetermined angle from the time point t1, and when the second light sources 32 are turned on, a point R2 in FIG. 7 is irradiated with the infrared light. As in a case of the point R1, at this time, the other regions are not irradiated with the infrared light, and the first light sources 31 does also not emit the visible light. In this state, the light receiving unit 34 is exposed, and the reflected light of the infrared light reflected at the point R2 is detected. Then, for example, when the intensity of the reflected light of the infrared light detected by the light receiving unit 34 is equal to or greater than the predetermined value, the control unit 101 determines that there is an object at the point R2, and when the intensity of the reflected light of the infrared light detected by the light receiving unit 34 is less than the predetermined value, the control unit 101 determines that there is no object at the point R2.

In this way, by repeatedly turning on and off the second light sources 32 while rotating the rotating reflector 33, the control unit 101 can determine whether there is the object at a high speed (at least at a speed necessary to perform the light distribution control at a practical level) for all the points in the range P3.

When the infrared light is emitted from the second light sources 32 toward all the points in the range P3, the control unit 101 determines whether there is the object based on an output of the light receiving unit 34, and controls (turns on, turns off, and dims) the first light sources 31 based on a determination result. The above determination may be performed by further taking into account the above-described information (the information from the in-vehicle camera 6, the various radars 7, and the like) provided from the vehicle control unit 3.

Figure 9:
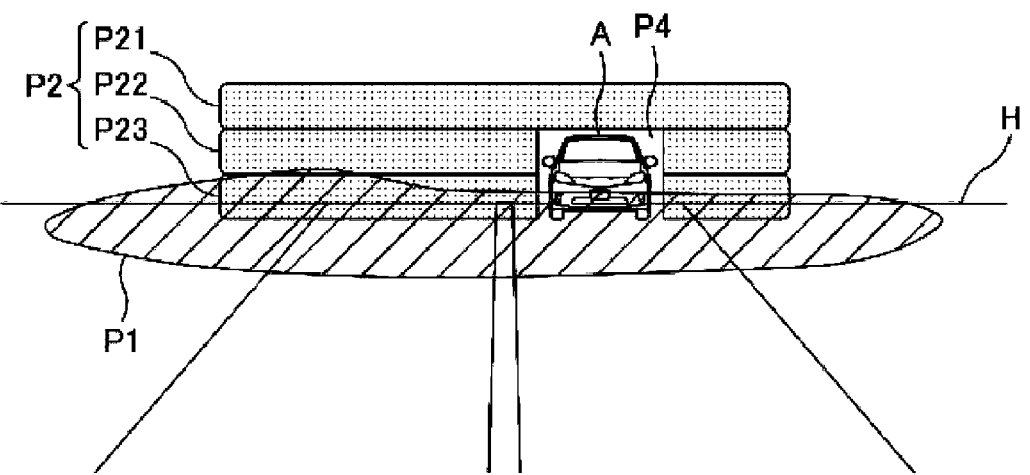
FIG. 9 is an example of a light distribution pattern of the visible light obtained by controlling a first light source.

FIG. 9 is an example of the light distribution pattern of the visible light obtained by the control unit 101 controlling the first light sources 31. The light distribution pattern is formed, for example, so as not to give glare to another vehicle (oncoming vehicle A) and to brightly illuminate a wider range. The exemplified light distribution pattern is formed by the control unit 101 performing the following control. The region setting unit 103 of the control unit 101 sets a dimming region P4 at a position including the object (oncoming vehicle A) determined based on the determination result. The control unit 101 causes the light source control unit 102 to supply a current having a first current value to the first light source 31 and emit the visible light at a normal luminance toward a range excluding the dimming region P4 in the range P2 which is the emission range of the first light sources 31. Then, the control unit 101 causes the light source control unit 102 to supply a current having a second current value smaller than the first current value to the first light sources 31 and emit the visible light toward the dimming region P4 at an luminance lower than the normal luminance.

As described above, according to the vehicle lamp 1 of the present embodiment, by scanning the light emitted from the first light sources 31 to form the light distribution pattern and controlling the light emission intensity of the first light sources 31, it is possible to form a region with low luminance in a part of the light distribution pattern arbitrarily. Each of the right headlamp 10R and the left headlamp 10L includes the second light sources 32 and the light receiving unit 34 as sensing mechanisms for sensing the front of the vehicle. Since the second light sources emit the infrared rays, the front can be accurately scanned even when visual recognition is not easy, such as at night. The visible light emitted from the first light sources can be emitted to the partial region of the light distribution pattern of the first light sources according to a front scanning result.

When the sensing mechanism such as the in-vehicle camera 6 is provided at a position away from the first light sources, parallax occurs between the sensing mechanism and the first light sources 31. At this time, the sensing mechanism may not be able to accurately determine an actual position of the object, and the position of the dimming region P4 set based on the determination result may not be able to be accurately set.

In the vehicle lamp 1 according to the present embodiment, the second light sources 32 and the light receiving unit 34, which are the sensing mechanisms, are provided close to the first light sources 31. Accordingly, it is possible to reduce the parallax generated between the sensing mechanisms and the first light sources 31. At this time, since the sensing mechanisms can accurately determine the actual position of the object, the accuracy of the dimming region P4 set based on the determination result is improved.

In order to stably and accurately control the light distribution pattern, it is necessary to ensure independence between the right headlamp 10R and the left headlamp 10L. For example, when the infrared light emitted from the second light sources 32 of the right headlamp 10R is incident on the light receiving unit 34 of the left headlamp 10L, the control of the light distribution pattern by the first light sources 31 of the left headlamp 10L may be affected. Conversely, when the infrared light emitted from the second light sources 32 of the left headlamp 10L is incident on the light receiving unit 34 of the right headlamp 10R, the control of the light distribution pattern by the first light sources 31 of the left headlamp 10L may be affected. Therefore, several solving methods for this problem will be described below.

Figure 10:
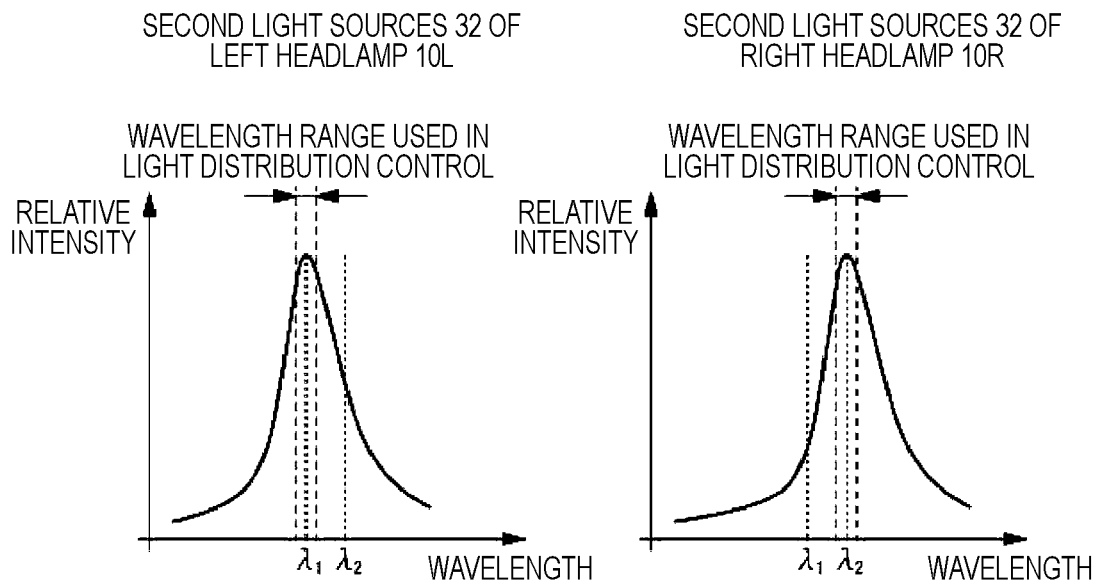
FIG. 10 is a diagram showing a first method for ensuring stability and accuracy of the light distribution control.

FIG. 10 is a diagram showing a first method, and is a graph showing a relationship between the relative intensity and the wavelength of the infrared light emitted from the second light sources 32 of each of the left headlamp 10L and the right headlamp 10R. As shown in FIG. 10, in the first method, the second light sources 32 of the left headlamp 10L and the second light sources of the right headlamp 10R are configured such that a peak wavelength λ1 of the infrared light emitted from the second light sources 32 of the left headlamp 10L and a peak wavelength λ2 of the infrared light emitted from the second light sources 32 of the right headlamp 10R are different from each other. Specifically, for example, the light emitting elements constituting the second light sources 32 of the left headlamp 10L and the second light sources of the right headlamp 10R may have different peak wavelengths. Further, the second light sources 32 of the left headlamp 10L and the second light sources 32 of the right headlamp 10R may be configured to be capable of setting a plurality of peak wavelengths, such that the second light sources 32 of the left headlamp 10L and the second light sources 32 of the right headlamp 10R may be configured to emit the infrared light having wavelengths different from each other.

In the first method, the sensitivity of the light receiving unit 34 of the left headlamp 10L is set such that (the reflected light of) the infrared light emitted from the second light sources 32 of the right headlamp 10R does not affect the light distribution control of the visible light emitted from the first light sources 31 of the left headlamp 10L. Further, the sensitivity of the light receiving unit 34 of the right headlamp 10R is set such that (the reflected light of) the infrared light emitted from the second light sources 32 of the left headlamp 10L does not affect the light distribution control of the visible light emitted from the first light sources 31 of the right headlamp 10R.

Figure 11:
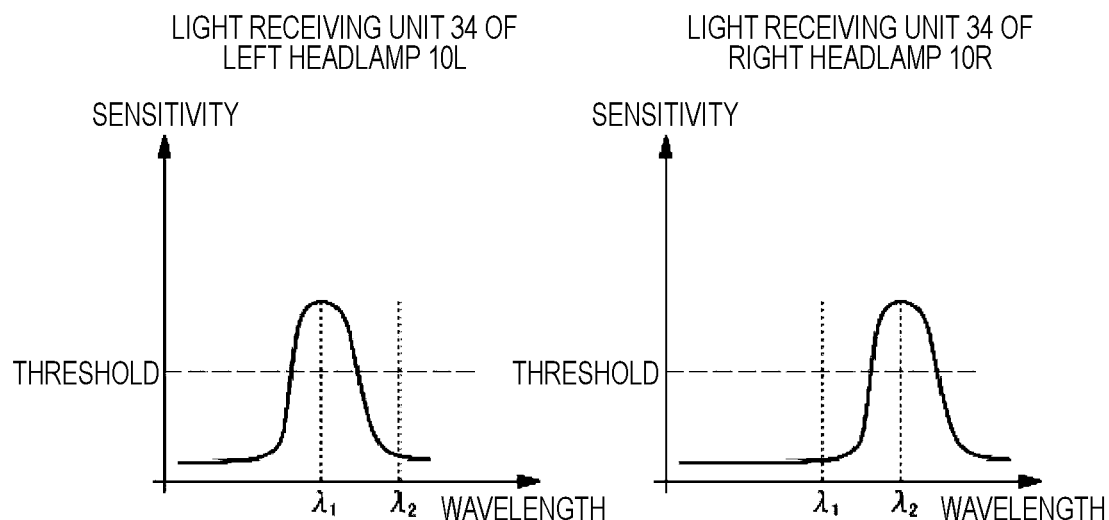
FIG. 11 is a diagram showing the first method.

FIG. 11 is a graph showing a wavelength characteristic of the sensitivity of the light receiving unit 34 of the left headlamp 10L and a wavelength characteristic of the sensitivity of the light receiving unit 34 of the right headlamp 10R. As shown in FIG. 11, the light receiving unit 34 of the left headlamp 10L is set such that the sensitivity to the peak wavelength λ2 of the infrared light emitted from the second light sources 32 of the right headlamp 10R is smaller than the sensitivity to the peak wavelength λ1 of the infrared light emitted from the second light sources 32 of the left headlamp 10L. For example, the light receiving unit 34 of the left headlamp 10L is configured to exhibit a sensitivity higher than a predetermined threshold with respect to the wavelength within a predetermined wavelength width (not including the wavelength λ2) centered on the peak wavelength λ1 of the infrared light emitted from the second light sources 32 of the left headlight 10L, and to exhibit a sensitivity lower than the predetermined threshold with respect to the wavelength outside the predetermined wavelength width. The light receiving unit 34 of the right headlamp 10R is set such that the sensitivity to the peak wavelength λ1 of the infrared light emitted from the second light sources 32 of the left headlamp 10L is smaller than the sensitivity to the peak wavelength λ2 of the infrared light emitted from the second light sources 32 of the right headlamp 10R. For example, the light receiving unit 34 of the right headlamp 10R is configured to exhibit a sensitivity higher than the predetermined threshold with respect to the wavelength within the predetermined wavelength width (not including the wavelength λ1) centered on the peak wavelength λ2 of the infrared light emitted from the second light sources 32 of the right headlight 10R, and to exhibit a sensitivity lower than the predetermined threshold with respect to the wavelength outside the predetermined wavelength width. The setting of the sensitivities of the light receiving units 34 can be implemented by, for example, providing the light receiving units 34 with the light receiving elements capable of obtaining the desired sensitivity. Further, the light receiving unit 34 of the left headlamp 10L and the light receiving unit 34 of the right headlamp 10R may be configured to be capable of setting a wavelength at which the sensitivity is maximum, and thus the light receiving unit 34 of the left headlamp 10L and the light receiving unit 34 of the right headlamp 10R may be configured to exhibit the maximum sensitivities at the wavelengths different from each other.

According to the first method, the peak wavelengths of the second light sources of the right headlamp 10R and the left headlamp 10L are different from each other, and therefore the light receiving unit 34 can determine from which headlight the incident light is emitted. It is possible to prevent the influence on the light distribution control due to the infrared light emitted from the second light sources 32 of one of the right headlamp 10R and the left headlamp 10L being incident on the light receiving unit 34 of the other. Accordingly, the independence between the right headlamp 10R and the left headlamp 10L is ensured, and the light distribution control in each of the right headlamp 10R and the left headlamp 10L can be stably and accurately performed. According to the above method, the infrared light can be simultaneously emitted from the second light sources 32 of the right headlamp 10R and the second light sources 32 of the left headlamp 10L, and thus the light distribution control with high time density can be efficiently performed.

In a second method, the control unit 101 of each of the right headlamp 10R and the left headlamp 10L controls the timing of turning on and off the second light sources 32 such that the second light sources 32 of the right headlamp 10R and the second light sources 32 of the left headlamp 10L do not emit the infrared light at the same time. Specifically, the control unit of the right headlamp 10R and the control unit 101 of the left headlamp 10L communicate with each other via the communication network N, and therefore the timings of turning on and off the second light sources of the right headlamp 10R and the left headlamp 10L are controlled such that the second light sources 32 of the right headlamp 10R and the second light sources 32 of the left headlamp 10L do not emit the infrared light at the same time.

Figure 12:
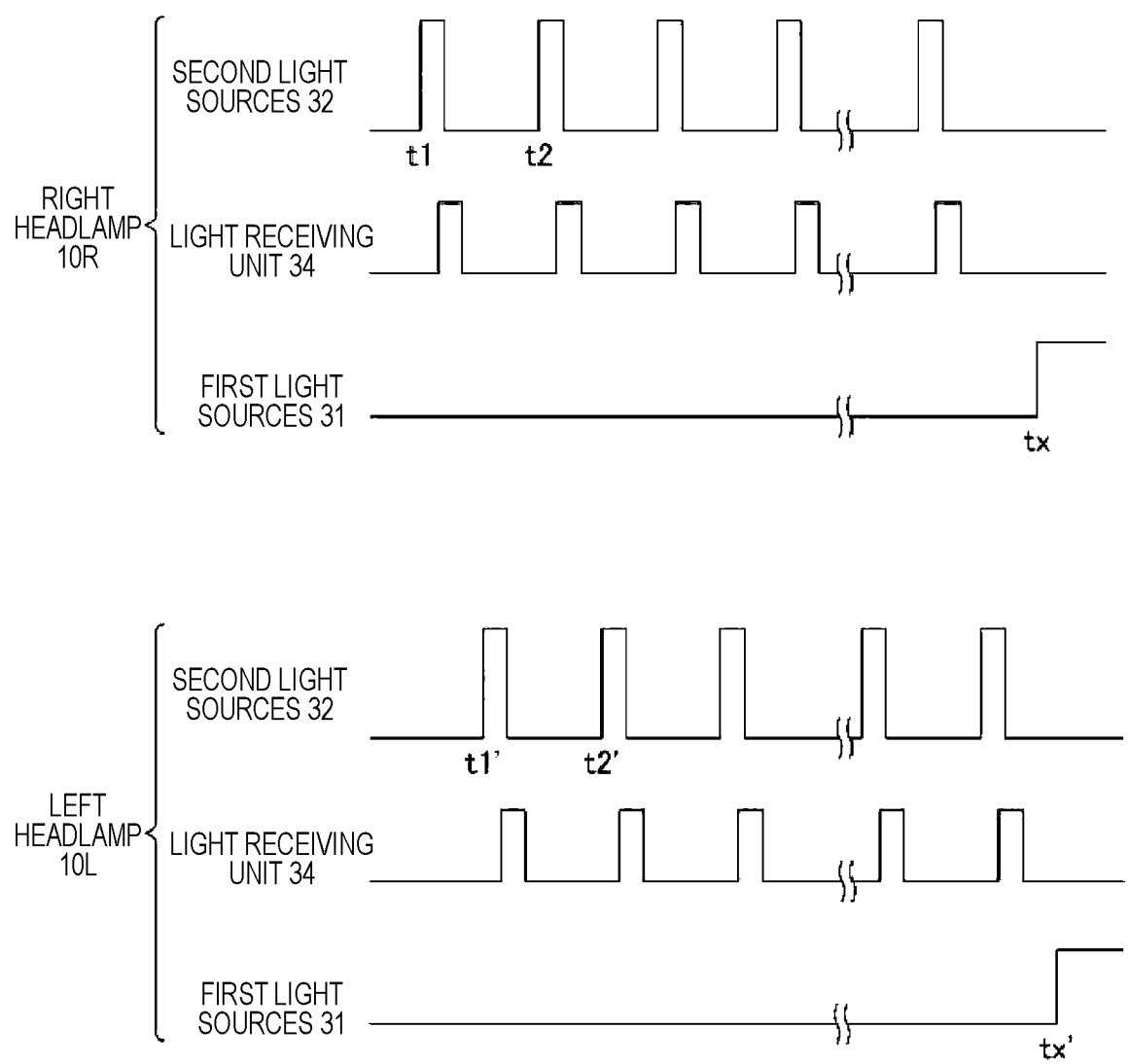
FIG. 12 is a timing chart showing a second method.

FIG. 12 is an example of the control performed in the vehicle lamp 1 with respect to the second method, and is a timing chart showing the control of turn-on timings of the first light sources 31 and the second light sources 32 and exposure timings of the light receiving units 34. Hereinafter, the control in the second method will be described with reference to FIG. 12. It is assumed that visible light is not emitted from the first light sources 31 during a period in which the sensing is performed by the second light sources 32 and the light receiving units 34.

First, at the time point t1, the infrared light is emitted from the second light sources 32 of the right headlamp 10R, and the light receiving unit 34 of the right headlamp 10R is exposed to the light, and a standby state of the reflected light of the infrared light is entered. Thereafter, the exposure of the light receiving unit 34 of the right headlamp 10R is stopped before the infrared light is emitted from the left headlamp 10L. That is, the light receiving unit 34 of the right headlamp 10R is not exposed during the period in which the reflected light of the light emitted from the second light sources 32 of the left headlamp 10L may be incident.

Subsequently, at a time point t1', the infrared light is emitted from the second light sources 32 of the left headlamp 10L, and the light receiving unit 34 of the left headlamp 10L is exposed to light, and the standby state of the reflected light of the infrared light is entered. Thereafter, the exposure of the light receiving unit 34 of the left headlamp 10L is stopped before the infrared light is emitted from the second light sources 32 of the right headlamp 10R. That is, the light receiving unit 34 of the left headlamp 10L is not exposed during the period in which the reflected light of the light emitted from the second light sources 32 of the right headlamp 10R may be incident.

At the time point t2, the same control as that performed at the time point t1 is performed. Subsequently, at a time point t2', the same control as that performed at the time point t1' is performed.

In this way, by repeating the control of the exposure timings of the light receiving units 34 and the control of the turning on and off timings of the second light sources 32 while rotating the rotating reflector 33, the control unit 101 can determine whether there is the object at a high speed (at least at a speed necessary to perform the light distribution control at a practical level) for all the points in the range P3.

The method (method of controlling whether the information output from the light receiving unit 34 is handled as valid) of controlling the exposure of the light receiving unit 34 by the control unit 101 is not necessarily limited, and examples thereof include a method of turning on and off the power supply to the light receiving unit 34 and a method of determining whether the information output from the light receiving unit 34 is valid or invalid by the control unit 101 using an algorithm.

According to the second method, since the second light sources 32 of the right headlamp 10R and the second light sources of the left headlamp 10L do not emit the light at the same time, the light reflected by the object does not reach the light receiving unit 34 at the same time. The light receiving unit 34 of the right headlamp 10R and the light receiving unit 34 of the left headlamp 10L are less likely to confuse which of the second light sources 32 of the right headlamp 10R and the left headlamp 10L the reached light is emitted from. Since the independence of the right headlamp 10R and the left headlamp 10L is ensured, it is possible to prevent the influence on the light distribution control due to the light emitted from the second light sources 32 of one of the right headlamp 10R and the left headlamp 10L being incident on the light receiving unit 34 of the other. Accordingly, the light distribution control in each of the right headlamp 10R and the left headlamp 10L can be stably and accurately performed. Since the other light receiving unit 34 is not exposed in the period in which the light emitted from the second light source 32 of one of the right headlamp 10R and the left headlamp 10L is likely to be incident on the other light receiving unit 34, the independence between the right headlamp 10R and the left headlamp 10L is more reliably ensured. Further, according to the second method, the light emitting elements having the same or close peak wavelengths can be adopted as the light emitting elements used for the second light sources 32 of the right headlamp 10R and the second light source 32 of the left headlamp 10L, whereby the number of components can be reduced and the cost can be reduced.

As described above in detail, according to the vehicle lamp 1 of the present embodiment, it is possible to stably and accurately perform the light distribution control of the emission beam. Since the light distribution control can be stably and accurately performed, for example, it is possible to narrow a region in which the luminance of the emission beam for preventing glare from being applied to another vehicle (the oncoming vehicle or the like) is reduced, to widen a region in which the emission beam is emitted with a normal luminance, and to improve visibility during the driving.

Although the embodiment according to the present disclosure has been described in detail above, the present disclosure is not limited to the above-described embodiment and includes various modifications. The above-described embodiment has been described in detail in order to explain the present disclosure in an easy-to-understand manner, and the present disclosure is not necessarily limited to the one including all the configurations described above. Further, a part of the configuration of the above-described embodiment can be added to, deleted from, or replaced with another configuration.

Figure 13:
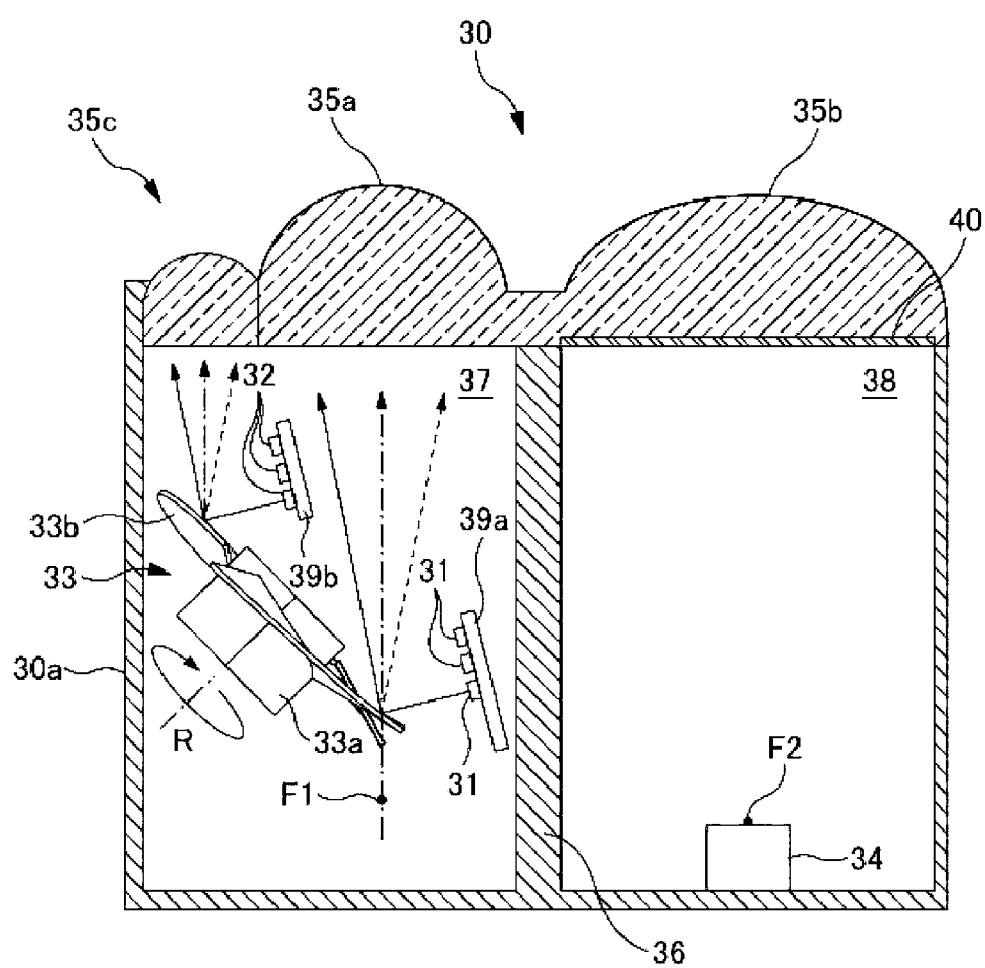
FIG. 13 is a diagram showing another configuration of the HB unit.

For example, as shown in FIG. 13, the first light sources 31 and the second light sources 32 may be provided on separate substrates. In an example of FIG. 13, the three first light sources 31 are linearly arranged on a substrate 39a, and the three second light sources 32 are linearly arranged on a substrate 39b. In this example, a third lens element 35c is further provided. The substrate 39a, the substrate 39b, and the rotating reflector 33 are disposed such that the visible light emitted from first light sources 31 passes through the second lens element 35b, and the infrared light emitted from second light sources 32 passes through the third lens element 35c.

For example, the sensitivity of the light receiving unit 34 with respect to the light emitted from the first light sources 31 may be set so as not to affect the light distribution control of the visible light emitted from the first light sources 31. The sensitivity of the light receiving unit 34 is set, for example, by selecting a light receiving element having a characteristic corresponding to the sensitivity to be set as the light receiving element constituting the light receiving unit 34. At this time, even when the visible light emitted from the first light sources 31 is incident on the light receiving unit 34, the light receiving unit 34 does not detect the visible light due to the sensitivity setting of the light receiving unit 34. Accordingly, since the influence on the light distribution control by the first light sources can be reduced, the right headlamp 10R and the left headlamp 10L can perform the light distribution control in a more stable and accurate manner.

Further, for example, the configuration of the vehicle lamp 1 described above may be applied to a near-infrared camera (a camera that emits the near infrared light (near infrared rays) toward a region to be captured by the near infrared light, receives the reflected light of the emitted near infrared light from the object, and outputs a video or an image). Specifically, the near infrared light is emitted from the first light sources 31, the infrared light (infrared rays) is emitted from the second light sources 32, the reflected light that is emitted from the second light sources 32, reflected by the object, and returned is received by the light receiving unit 34, and the light distribution pattern of the near infrared light emitted from the first light sources 31 is controlled based on the intensity of the reflected light output by the light receiving unit 34. The above control is performed, for example, for a purpose of adjusting a brightness of the output video or image. That is, for example, by controlling the light distribution pattern so as to increase the intensity of the near infrared light emitted to a region where the intensity of the reflected light is small, it is possible to improve clarity or the like of the output video or image. In addition, for example, the above control is performed for a purpose of reducing halation. That is, for example, the halation is reduced by controlling the light distribution pattern such that the intensity of the near infrared light emitted to the region where the intensity of the reflected light is large is reduced.

The present application appropriately incorporates the contents disclosed in Japanese Patent Application No. 2020-025321 filed on Feb. 18, 2020.

The invention claimed is:

1. A vehicle lamp comprising:
a first lamp unit and a second lamp unit each including a first light source configured to emit light, a second light source configured to emit light having a peak wavelength different from that of the first light source, and a light receiving unit configured to detect an intensity of reflected light of the light emitted from the second light source; and
a control unit configured to perform light distribution control of the light emitted from the first light source in accordance with the intensity of the reflected light detected by the light receiving unit, wherein
a peak wavelength of the light emitted from the second light source of the first lamp unit is different from a peak wavelength of the light emitted from the second light source of the second lamp unit;
the light receiving unit of the first lamp unit is set such that sensitivity to the light emitted from the second light source of the second lamp unit is smaller than sensitivity to the peak wavelength of the light emitted from the second light source of the first lamp unit, and
the light receiving unit of the second lamp unit is set such that sensitivity to the light emitted from the second light source of the first lamp unit is smaller than sensitivity to the peak wavelength of the light emitted from the second light source of the second lamp unit.

2. The vehicle lamp according to claim 1, wherein the light emitted from the first light source is visible light including a wavelength of 400 nm to 700 nm, and the light emitted from the second light source is infrared light.

3. The vehicle lamp according to claim 1, wherein the light emitted from the first light source is near infrared light, and the light emitted from the second light source is infrared light.

4. The vehicle lamp according to claim 1, wherein the first lamp unit and the second lamp unit further includes a rotating reflector that rotates while reflecting the light emitted from the first light source and the light emitted from the second light source,
the rotating reflector forms a first light distribution pattern obtained by scanning the light emitted from the first light source, and forms a second light distribution pattern obtained by scanning the light emitted from the second light source, and
the control unit specifies a partial region of the first light distribution pattern based on the intensity of the reflected light of the light emitted from the second light source, and turns off or dims the first light source at a timing at which the partial region is scanned by the light emitted from the first light source.

5. A vehicle lamp comprising:
a first lamp unit and a second lamp unit each including a first light source configured to emit light, a second light source configured to emit light having a peak wavelength different from that of the first light source, and a light receiving unit configured to detect an intensity of reflected light of the light emitted from the second light source; and
a control unit configured to perform light distribution control of the light emitted from the first light source in accordance with the intensity of the reflected light detected by the light receiving unit, and to perform control such that the second light source of the first lamp unit and the second light source of the second lamp unit do not emit the light at the same time,
wherein the control unit of the first lamp unit performs control such that the light receiving unit of the first lamp unit is not exposed during a period in which the reflected light of the light emitted from the second light source of the second lamp unit is likely to be emitted, and
wherein the control unit of the second lamp unit performs control such that the light receiving unit of the second lamp unit is not exposed during a period in which the reflected light of the light emitted from the second light source of the first lamp unit is likely to be emitted.

6. A vehicle lamp comprising:
a first lamp unit and a second lamp unit each including a first light source configured to emit light, a second light source configured to emit light having a peak wavelength different from that of the first light source, and a light receiving unit configured to detect an intensity of reflected light of the light emitted from the second light source; and
a control unit configured to perform light distribution control of the light emitted from the first light source in accordance with the intensity of the reflected light detected by the light receiving unit, wherein
a peak wavelength of the light emitted from the second light source of the first lamp unit is different from a peak wavelength of the light emitted from the second light source of the second lamp unit;
wherein in the first lamp unit and the second lamp unit, the sensitivities of the light receiving units to the light emitted from the first light sources are set so as not to affect the light distribution control of the light emitted from the first light sources.

* * * * *